H. H. MacTAGGART AND R. G. SCOTT.
TELEMOTOR APPARATUS.
APPLICATION FILED MAY 15, 1917.

1,332,050.

Patented Feb. 24, 1920.
8 SHEETS—SHEET 3.

Inventors—
Hugh H. MacTaggart,
Robert G. Scott,
by their Attorneys,

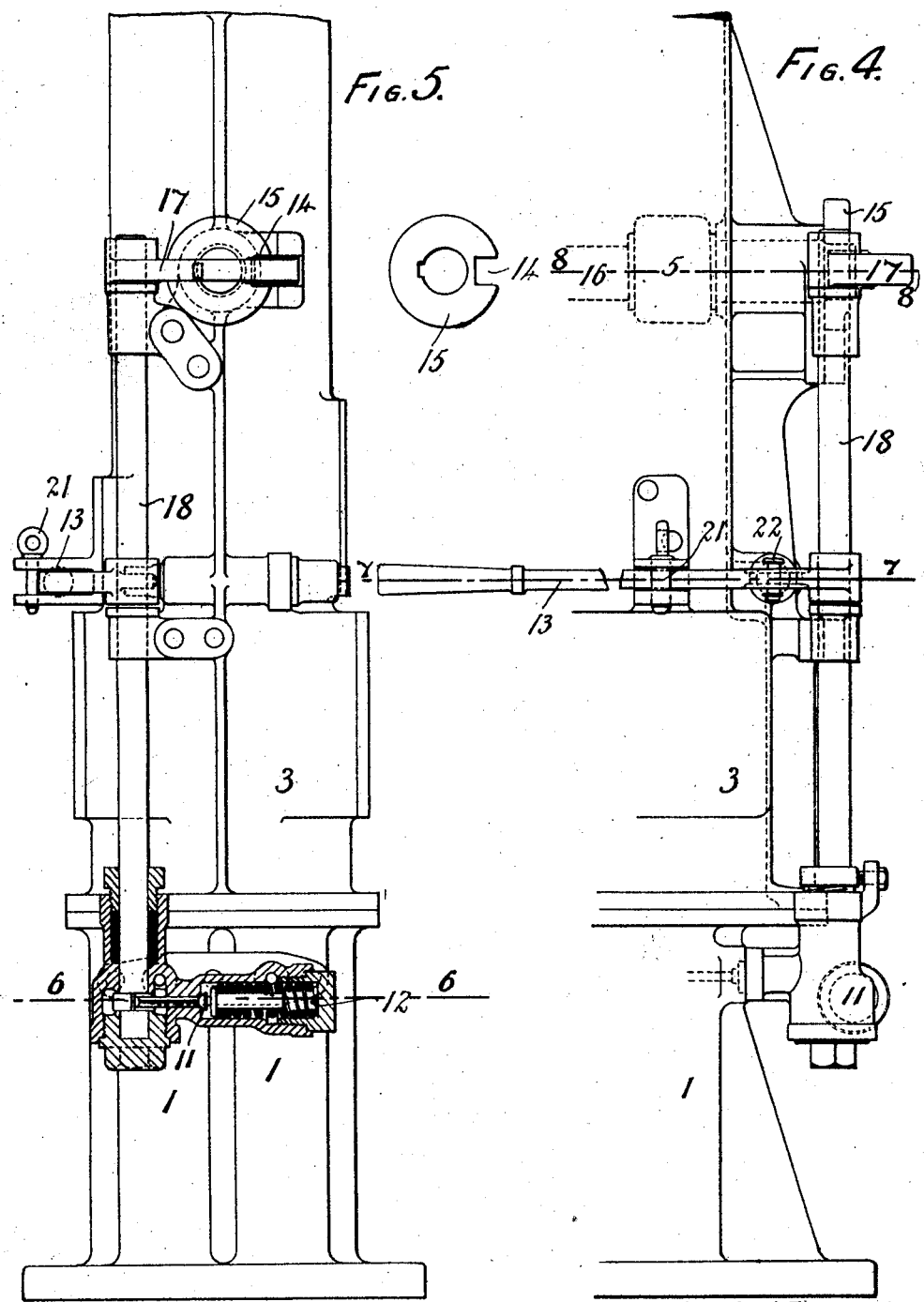

H. H. MacTAGGART AND R. G. SCOTT.
TELEMOTOR APPARATUS.
APPLICATION FILED MAY 15, 1917.
1,332,050.
Patented Feb. 24, 1920.
8 SHEETS—SHEET 5.
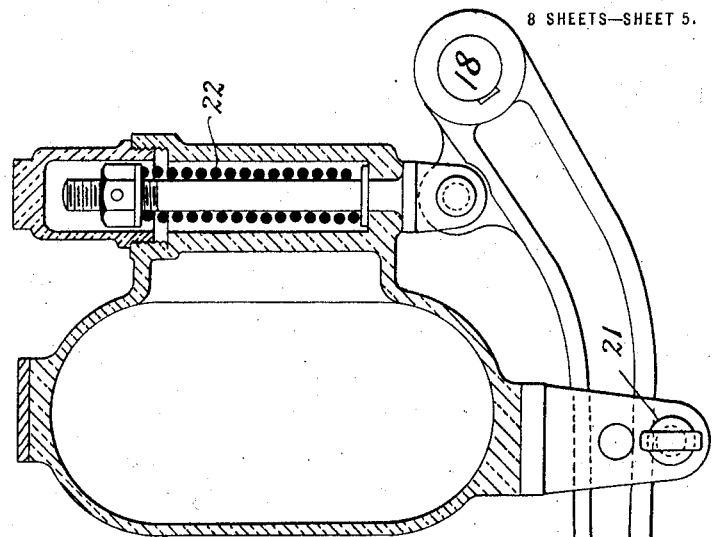
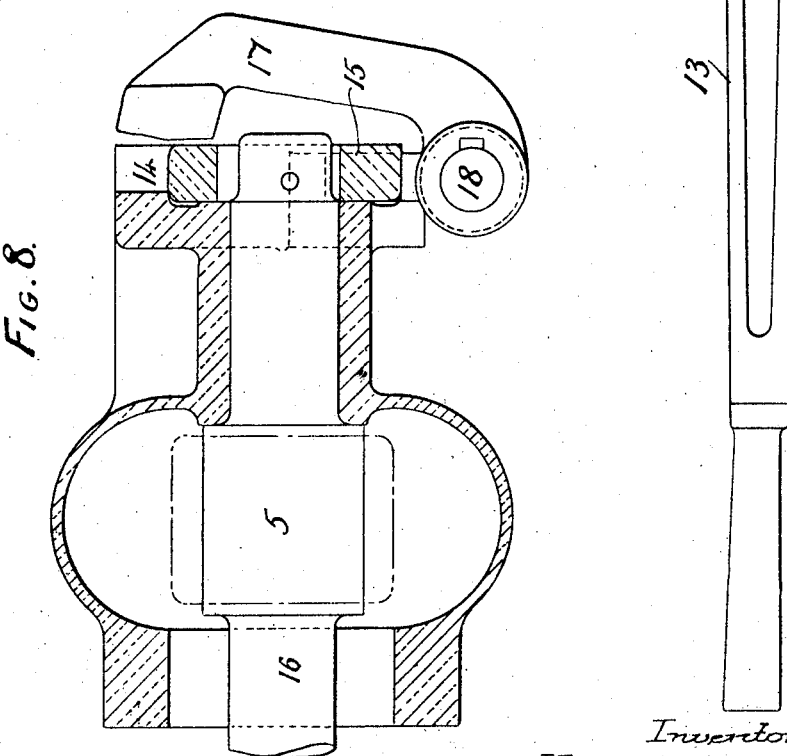
Inventors.—
Hugh H. MacTaggart,
Robert G. Scott.
by their Attorneys.—
Howson & Howson

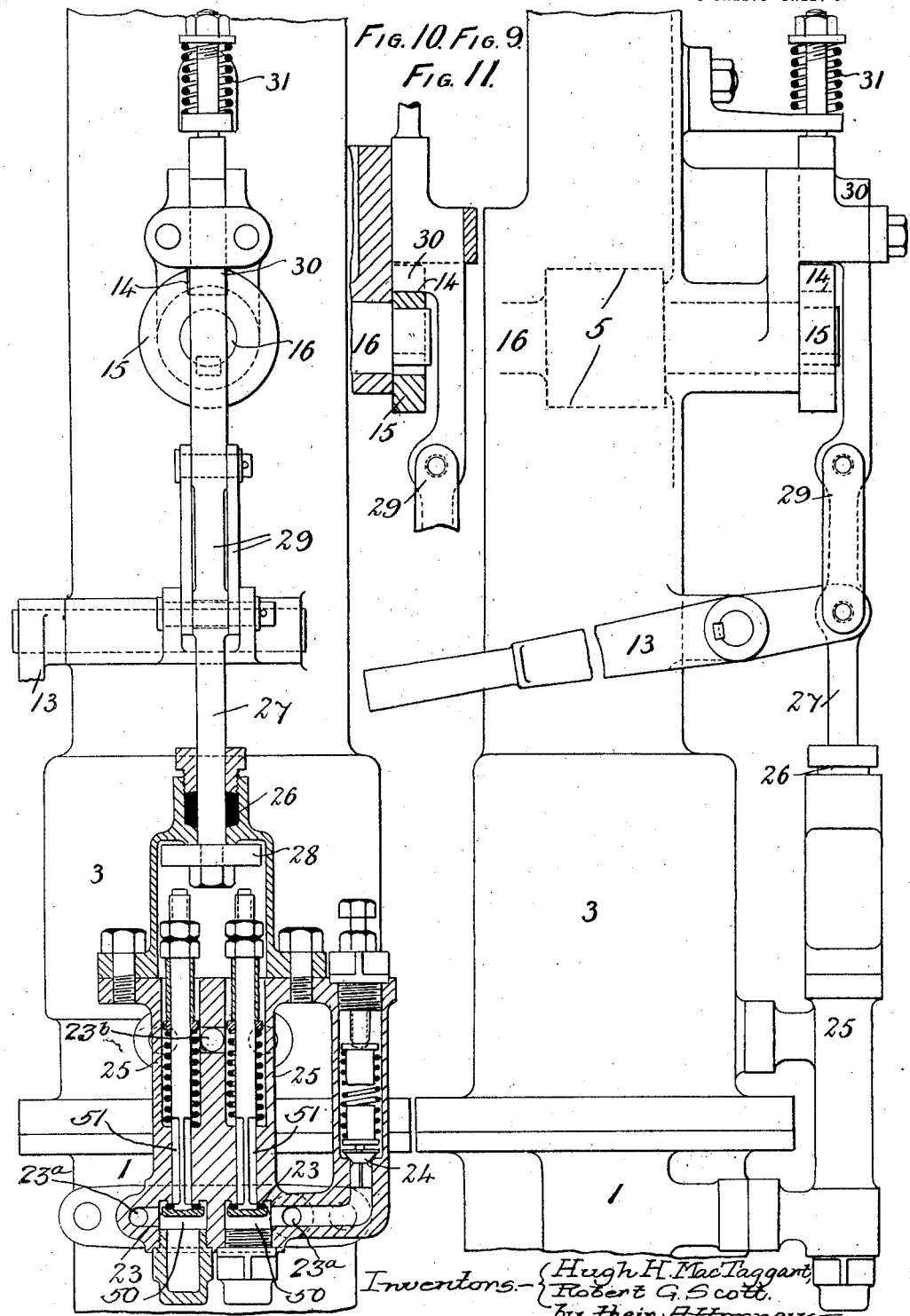

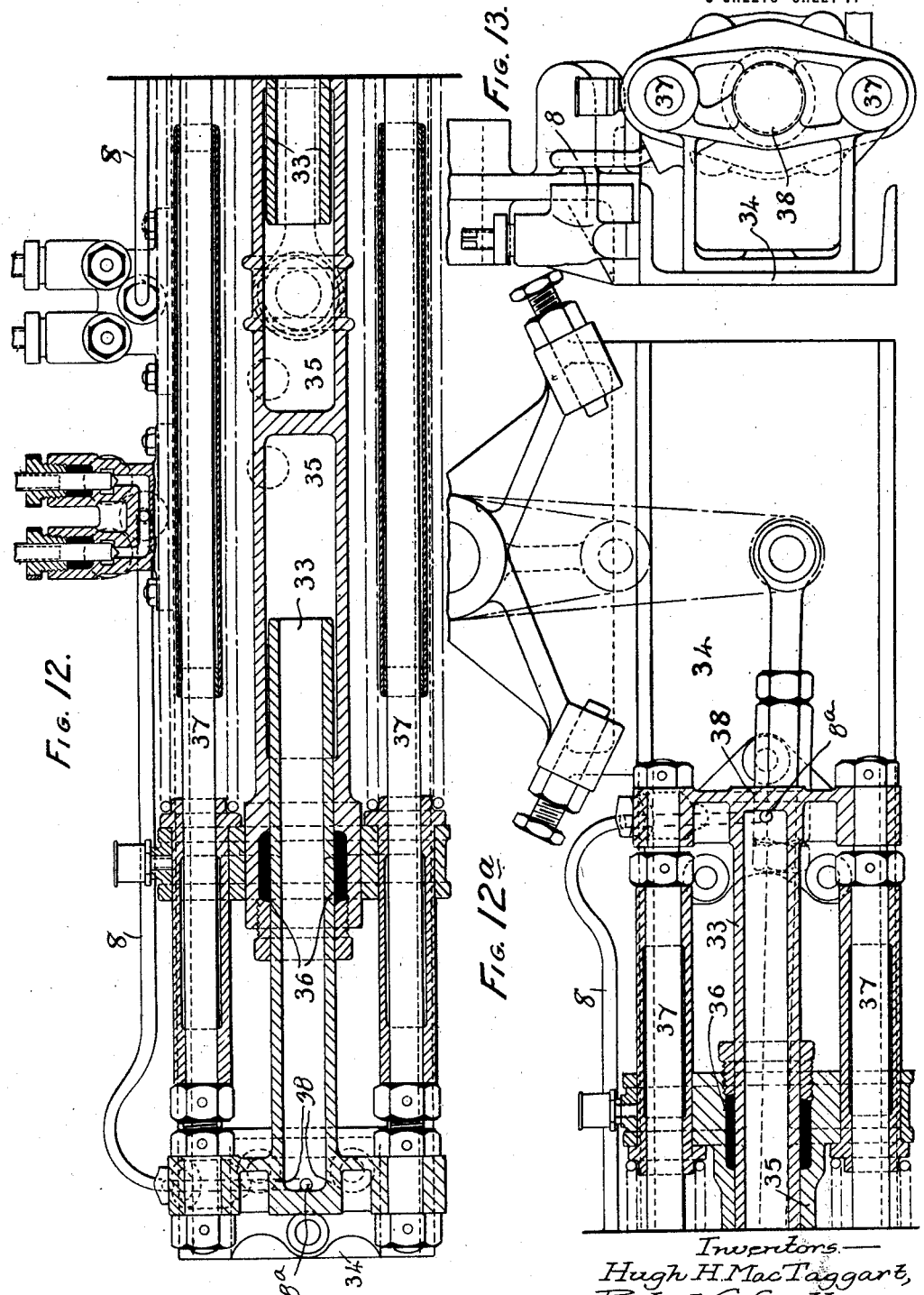

H. H. MacTAGGART AND R. G. SCOTT.
TELEMOTOR APPARATUS.
APPLICATION FILED MAY 15, 1917.
1,332,050.
Patented Feb. 24, 1920.
8 SHEETS—SHEET 8.
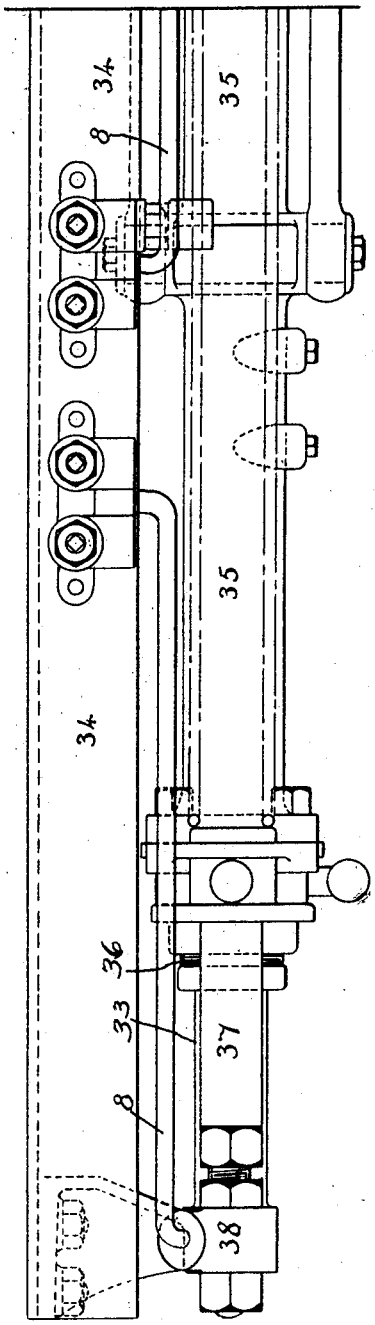
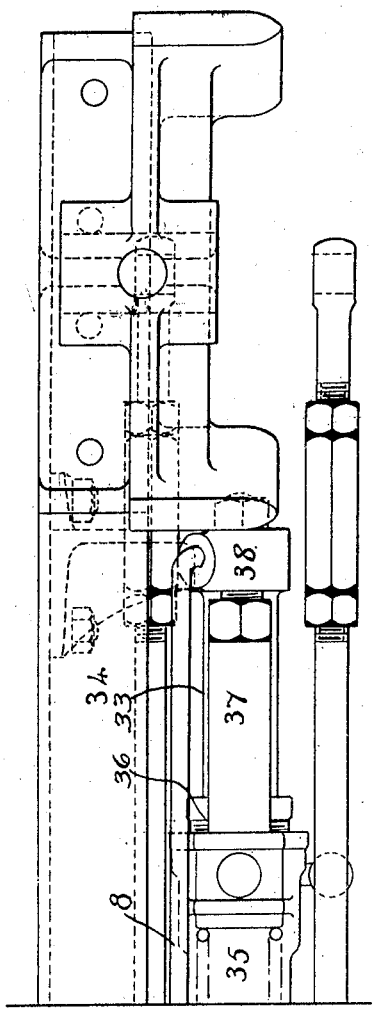
Inventors—
Hugh H. MacTaggart,
Robert G. Scott.
by their Attorneys.

UNITED STATES PATENT OFFICE.

HUGH H. MacTAGGART AND ROBERT G. SCOTT, OF LOANHEAD, SCOTLAND.

TELEMOTOR APPARATUS.

1,332,050.     Specification of Letters Patent.     Patented Feb. 24, 1920.

Application filed May 15, 1917. Serial No. 168,865.

*To all whom it may concern:*

Be it known that we, HUGH HOLMES MAC-TAGGART and ROBERT GRIGOR SCOTT, (hydraulic and general engineers,) subjects of the King of Great Britain and Ireland and the Isle of Man, and residents of Loanhead, Scotland, have invented new and useful Improvements in Telemotor Apparatus, of which the following is a specification.

This invention has reference to improvements in telemotor apparatus and consists in providing the steering telemotor cylinders with a safety by-pass valve or valves adapted to be manually operated so as to equalize the pressure on both sides of the system when the steering wheel is in the mid position.

Heretofore, telemotors have so far all been fitted with a by-pass arrangement in or connected to the cylinder of the steering telemotor with springs on the motor telemotor, the two together forming an automatic device for correcting any discrepancy due to internal or external leakage between the two gears, every time the wheel on the steering telemotor is brought to the amidship position. In telemotors having leather packed pistons, the usual arrangement has been to have a port or ports formed in the steering telemotor cylinder, both ends of which are open when the piston is in the amidships position, thus enabling the liquid to flow from the one side of the piston to the other. The principal drawback to this type is that the efficiency of the gear depends upon the leathers, and as these wear out owing to the cutting action of the by-pass ports, it is not altogether satisfactory.

Another arrangement at present used is to have an external by-pass valve or valves controlling communication between opposite sides of the system, mechanically operated from the steering wheel by cams or other mechanism when the wheel is in the mid position.

These mechanically operated by-pass valves are also unsatisfactory as they open and close every time the steering wheel passes the amidship position and as most of the steering is more or less about amidships, this means they are working all the time. The danger with mechanically operated valves is that the slightest speck of foreign matter on the face or wearing of the valves, will cause internal leakage and put the gear out of action, which may happen at a critical moment and cause serious damage to or loss of the vessel.

A further drawback to any automatic by-pass is that there must be a certain amount of idle time on the wheel at the amidships position. In leather packed pistons with internal by-pass ports, this must be sufficient to allow the piston to travel over the ports and with mechanically operated by-pass valves sufficient movement of the wheel to raise or lower these valves. The idle time on either system is never less than 5-7 degrees and with mechanically operated by-pass valves is bound to increase as the cam mechanism wears. It is therefore necessary for the quartermaster if he is putting the gear from port to starboard or vice versa, to pause for a few seconds at the amidships position in order to allow the steering engine, which always lags more or less behind the telemotor, to come to the amidships position before the steering wheel is put to the starboard side or vice versa.

When steering in tortuous channels, the quartermaster frequently has to put the wheel rapidly from hard over to hard over several times, and from nervousness or excitement, he may not pause for the necessary few seconds at the amidships position to allow the engine to follow up, with the result that the steering telemotor jumps across the by-pass and the steering gear is at once 5-7 degrees out of correspondence with the steering wheel.

According to the improvements of this invention the cylinders of the steering telemotor are provided with a safety by-pass valve, controlling the passage of the liquid from one side of the system to the other, and adapted to be opened by means of a hand lever arranged close to the steering wheel while mechanism, comprising a cam formed with a gap or the like, adapted to engage with a lever or the like is provided so that the hand lever cannot be moved to open the valve unless the steering wheel is in the amidships position. This cam mechanism also acts as a lock for the steering wheel so that same cannot be moved when the valve has been opened by the hand lever.

By a slightly modified arrangement the suction valves usually provided on the cylinders of the steering telemotor and free to open under atmospheric pressure, should there be a shortage of liquid in the system, are adapted to act as the safety by-pass valve or valves, and are provided with similar cam and gap mechanism as the aforesaid arrangement so that when the valves have been opened by the hand lever the steering wheel is locked.

Steering telemotor cylinders provided with safety by-pass valves, such as mentioned, may be used in conjunction with motor telemotors which are arranged to occupy the smallest possible over-all length. Such motor telemotors may consist of two single acting fixed rams attached to abutments and two cylinders cast in one, free to move on the rams, with suitable arrangements for connecting to the wiper shaft of the steering gear, the usual centering springs being fitted for bringing the motor cylinder to the mid position.

In order that others skilled in the art may properly understand our invention and the manner of carrying the same into effect or practice, we have hereunto appended eight sheets of illustrative drawings in which:—

Fig. 4 is an elevation similar to Fig. 1, but only showing the safety by-pass valve and its operating mechanism.

Fig. 5 is an elevation, at right angles to Fig. 4, showing the safety by-pass valve in section.

Fig. 7 is a sectional plan view taken on the line 7—7 in Fig. 4.

Fig. 8 is a sectional plan view taken on the line 8—8 in Fig. 4.

Fig. 9 is an elevation of the steering telemotor illustrating the arrangement whereby the suction valves are adapted to act as the safety by-pass valves.

Fig. 10 is an elevation at right angles to Fig. 9, but showing the suction valves in section.

Fig. 11 illustrates the cam and gap in detail of the arrangement shown by Figs. 9 and 10, but with bolt engaged in gap of cam.

Fig. 12 is an elevation of the left hand portion of the motor telemotor constructed to occupy the smallest possible over-all length and which may be used in conjunction with the steering telemotor arrangements with the safety by-pass valves as illustrated by Figs. 1 to 11.

Fig. 12$^a$ is an elevation of the right hand portion of the motor telemotor illustrated by Fig. 12.

Figs. 12 and 12$^a$ which are shown partly in section are cut or divided simply for convenience in illustrating.

Fig. 13 is an end view corresponding to Fig. 12$^a$.

Fig. 14 is a plan view corresponding to Fig. 12.

Fig. 14$^a$ is a plan view corresponding to Fig. 12$^a$.

Referring to these drawings:—

In carrying the improvements of this invention into effect or practice two independent steering telemotor cylinders 1, having externally packed rams, 2, are arranged on the lower end of a pedestal, 3, with the rams, 2, pointing upward and connected to two racks, 4, in the usual way, which are operated by a pinion and gear, 5, from the steering wheel, 6. The upper end of the pedestal, 3, which carries the gearing, 5, forms the replenishing tank; the upper ends of the rams, 2, and the glands, 7, being immersed in the replenishing liquid (oil) thus preventing any possibility of drawing air into the system. Each of the cylinders, 1, is connected with a corresponding motor telemotor cylinder aft by copper pipes, 8, in the usual way; the motor telemotor being fitted with the usual centering spring or springs. Suction and safety valves, 9 and 10, respectively, of the usual type are fitted to the cylinders, 1, connecting the replenishing tank, with each of the cylinders, 1.

By using suitable packing for all the rams, a gear which will remain tight for an indefinite period is provided and by having no automatic by-pass valve, the idle time at the amidships position is got rid of (also any danger from internal leakage) so that the slightest movement in the amidships position will give a corresponding movement aft, the connection between the steering wheel, 6, and the steering engine being as rigid as with well designed shafting. To prevent jamming of the glands, 7, these are screwed into the stuffing box and locked in position, the adjustment being made at the manufacturing works before the gear is despatched.

Figure 1:
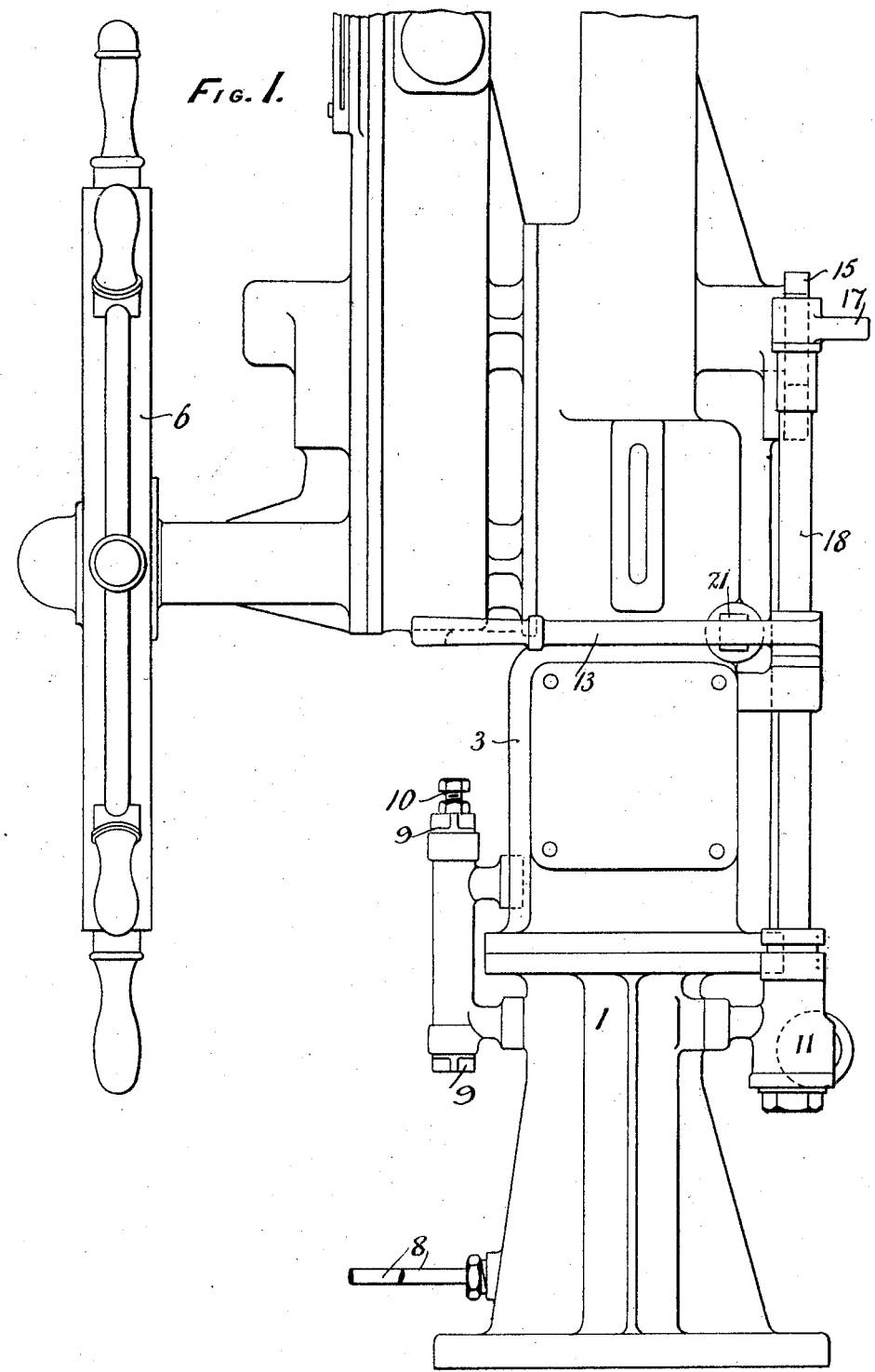
Figure 1 is a side elevation of the steering wheel and telemotor provided with a manually operated safety bypass valve according to the improvements of this invention.
Figure 2:
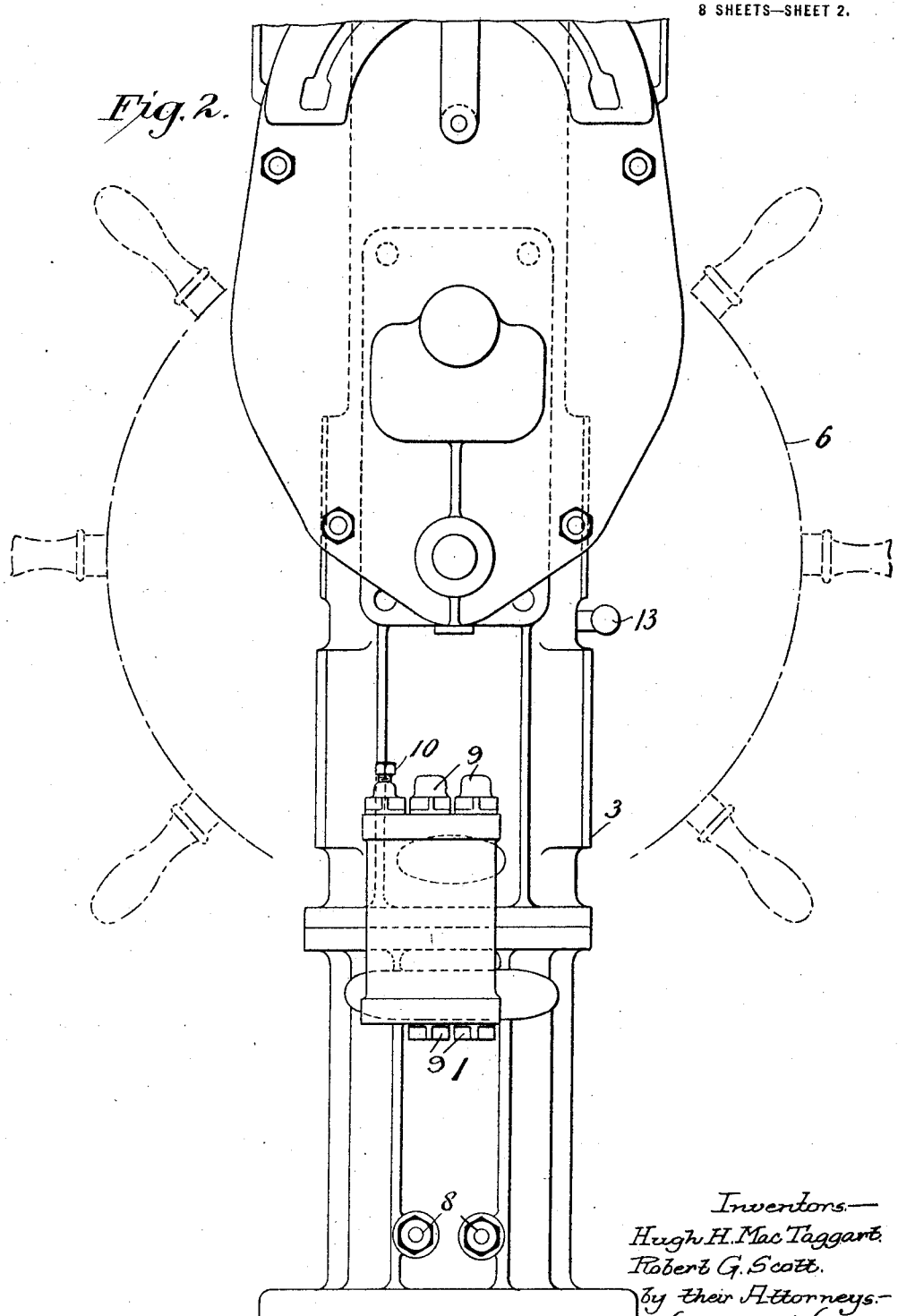
Fig. 2 is an elevation at right angles to Fig. 1, and indicates the steering wheel by chain-dotted outline.
Figure 3:
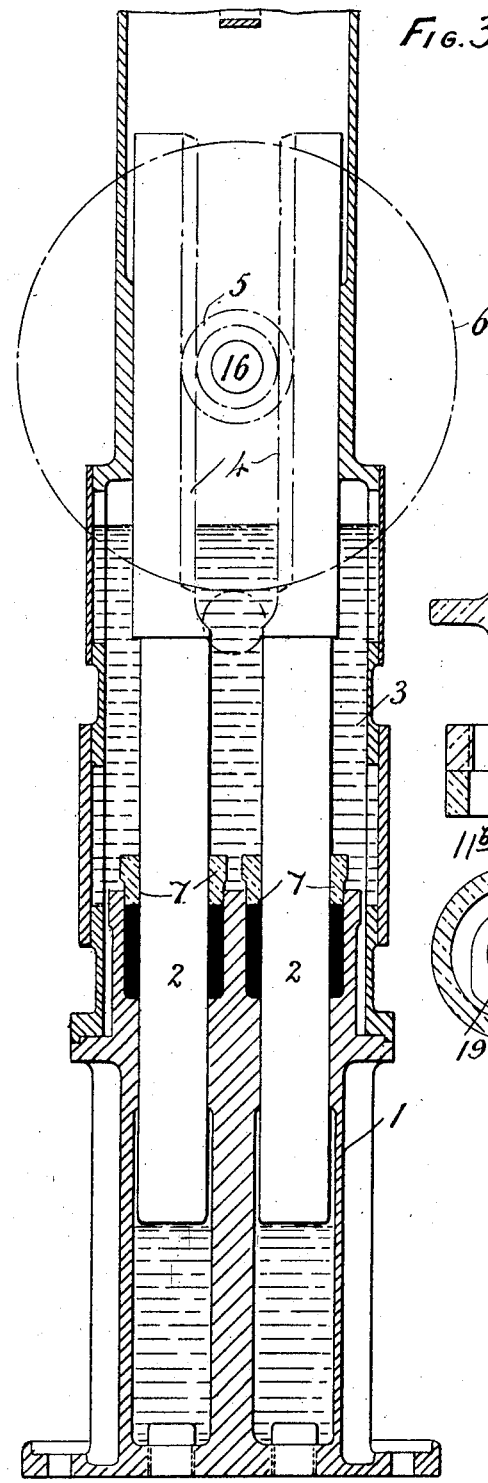
Fig. 3 is a sectional elevation corresponding to Figs. 1 and 2 of the cylinders, replenishing tank and rams.
Figure 6:
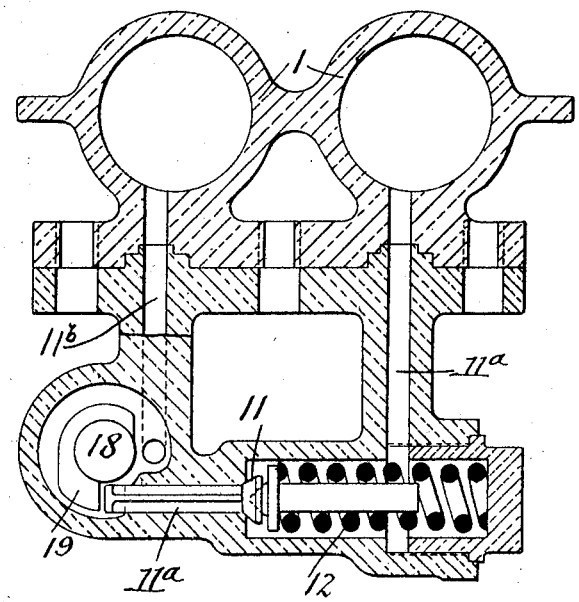
Fig. 6 is a sectional plan view taken on the line 6—6 in Fig. 5.

Should a slight leak develop at one of the joints in either of the pipe lines, or from one of the glands, this would put the steering telemotor out of correspondence with the motor telemotor, but in passing the amidships position the quartermaster would at once become aware of the discrepancy as he would feel that he was compressing the springs on the motor telemotor when his indicator pointer showed a few degrees on one side or the other of the amidships position. To correct this a safety by-pass valve, 11, having a spring, 12, is provided and is adapted to be opened by a hand lever, 13, arranged convenient to the steering wheel, 6. This valve, 11, can only be opened when the steering wheel, 6, and consequently the steering telemotor rams, 2, are in the amidships position and it is mounted in a passage 11ª connecting two other passages 11ᵇ leading from the two cylinders as shown in Fig. 6.

When in the amidships position a gap, 14, in a circular cam, 15, or equivalent mechanism which is carried on and revolves along with an extension of the rack pinion shaft, 16, or is otherwise operated by the gear, comes opposite a lever, 17, secured on the shaft, 18, on which the lever, 13, is secured. The lower end of the shaft, 18, is provided with a cam or the like, 19, adapted to open the valve, 11, against the action of the spring, 12, when the shaft, 18, is partially rotated by means of the hand lever, 13. A stop, 21, is provided to lock the hand lever, 13, while a spring, 22, is also provided to hold the lever, 17, clear of the cam, 15.

In any other position, than the mid-position, the circular part of the cam, 15, prevents the lever, 17, being moved and consequently the valve, 11, cannot be opened.

When the quartermaster finds that there is a discrepancy between the steering telemotor and the motor telemotor as above explained, he puts the steering wheel, 6, in the amidships position which brings the gap, 14, in the cam, 15, opposite the lever, 17, he then opens the valve, 11, by means of the hand lever, 13. The valve, 11, opens communication between both sides of the system, i. e., between the cylinders 1 through the passage 11ª and the motor springs aft equalize the liquid on both sides by forcing the motor gear to the amidships position. He then releases the hand lever, 13, and the lever, 17, springs clear of the gap, 14, in the cam, 15, and continues steering. The whole operation is the work of a few seconds and will only require to be done at rare intervals.

The safety device on the safety by-pass valve 11, prevents the quartermaster or any other person opening the by-pass valve, except at the amidships position, when no damage can be done even though no adjustment is required, as the lever, 17, in the gap, 14, of the cam, 15, forms a lock and prevents the wheel being turned in either direction until the lever is released.

According to the modified arrangement illustrated by Figs. 9, 10 and 11, two suction valves, that is one for each telemotor steering cylinder, and one safety valve, are provided instead of two suction valves, one safety valve, and one safety by-pass valve, as illustrated by Figs. 1 to 8, and the two suction valves are utilized as the safety by-pass valve as well as for performing their functions as suction valves.

These two suction valves would be operated by suitable mechanism on the same principle as the arrangement described in relation to Figs. 1 to 8.

The advantage of using these two valves is that the extra safety by-pass valve is dispensed with and further, the pressure under working conditions would always be on the closing side pressing the suction valves on their seats.

When the telemotor is working, the pressure is always on the underside of one or other of the suction valves tending to keep it tight on its face. In the arrangement illustrated by Figs. 1 to 8 the pressure is alternately on the top of the valve and underneath it and a spring sufficiently heavy to withstand full pressure must be fitted to prevent it opening in the latter case.

In carrying this modification into effect or practice a suction valve, 23, free to open under atmospheric pressure, should there be a shortage of liquid in the system, is provided for each steering telemotor cylinder, 1. Each of said valves is mounted in a chamber 50 connected to one of the cylinders 1 through a passage 23ª, and these chambers are permanently connected beyond said valves by passages 51 and a by pass passage 23ᵇ, Fig. 10. Alongside the valves, 23, is arranged the usual safety valve, 24, which opens should the pressure in that side of the system to which it is connected, become abnormal owing to increase of temperature or other cause.

The two suction valves, 23, in addition to their function as suction valves, are utilized as safety by-pass valves. On the top of the suction valve chest, 25, is fitted a cover with a stuffing box, 26, through which passes a spindle, 27, having a disk or plate, 28, attached to its end. The disk, 28, and spindle, 27, are connected by links 29, to a hand lever, 13. The upper end of the spindle, 27, carries a locking pin or bolt, 30, which, when the steering wheel, 6, is exactly amidships fits a gap, 14, in a cam, 15, carried by and revolved along with an extension of the rack pinion shaft, 16, or is otherwise operated by the gear.

When in the amidships position by raising the hand lever, 13, the bolt, 30, and spindle, 27, are depressed, the bolt enters the gap in the cam and the plate or disk on the end of the spindle depresses both suction valves together. This opens communication between both sides of the system and should there be any discrepancy between the steering and the motor telemotor cylinders, this would be corrected by the springs in the motor gear bringing the latter to the amidships position.

When the safety bolt engages the locking cam, the steering wheel is locked in the mid-position. A light spring, 31, or other device, is attached to the top end of the spindle, 27, and bolt, 30, and when the lever, 13, is let go it withdraws the bolt, retains it clear of the gap in the cam, and, at the same time, raises the plate on the end of the spindle clear of the suction valves which immediately close and cut off communication between the two sides of the system.

The above types of safety by-pass valves can be fitted to ram telemotors or piston telemotors and may be used in conjunction with motor telemotors as illustrated by Figs. 12 to 14.

In Figs. 12 to 14, two externally packed single acting rams, 33, of the motor telemotor would preferably be of the same diameter and stroke as the rams of the steering telemotor, and be mounted on the engine sole-plate by means of channel, 34, the motor cylinder, 35, being connected to the valve gear in the usual way. The over-all length of the motor telemotor should be kept at a minimum owing to the limited space available for its accommodation. The shortest arrangement is to have the two hydraulic cylinders, 35, cast together and on the same center line with the glands, 36, at the outside ends, the rams, 33, facing outward and being connected to each other by two side rods, 37, carried on the ram crossheads, 38; the distance between the face of the cylinders and the inside of the ram crossheads at mid-stroke being equal to half the stroke of the gear plus the clearance for the glands.

With the fixed cylinders and moving rams, in addition to the over-all length at mid-stroke, extra space must be provided at each end for half the stroke of the telemotor. Thus in a twelve inch stroke telemotor, an extra twelve inches must be provided, namely, six inches at each end.

By forming the ram crossheads into fixed abutments tied together by a channel or other suitable device so that the rams are stationary, the cylinders being free to move on the rams, the additional twelve inches of space above referred to is not required.

This motor telemotor is applicable to be used in combination or conjunction with the usual forms of automatic or mechanically operated by-pass valves communicating with the cylinders of the steering telemotors, or in conjunction with spring loaded safety by-pass valves controlled by cam mechanism and which can only be opened by a hand lever when the steering wheel and steering telemotor rams are in the amidships position.

What we claim and desire to secure by Letters Patent is:—

1. Telemotor apparatus comprising a steering wheel, steering telemotor cylinders, and by-pass mechanism connecting the two sides of the system, said by-pass mechanism comprising a valve controlled by the steering wheel and adapted to be opened manually only when the steering wheel is in amidships position.

2. Telemotor apparatus comprising steering telemotor cylinders, a manually operated by-pass flow governing means, and locking devices so that the said means cannot be opened unless the steering wheel is amidships and the steering wheel cannot be rotated when the said means has been manually opened substantially as herein set forth.

3. Telemotor apparatus comprising a cam having a gap therein, a locking member adapted to engage therewith, a hand lever, and a by-pass flow governing means adapted to be opened by said hand lever substantially as herein set forth.

4. Telemotor apparatus comprising a steering wheel; steering telemotor cylinders; suction valves for said cylinders; and manually operative means independent of said wheel for causing said valves to by-pass the cylinders; with a device for preventing operation of said means unless the steering wheel is in the amidships position, said device including mechanism for locking the steering wheel from movement when the valves are open.

In testimony whereof, we have signed our names to this specification, in the presence of two subscribing witnesses.

H. H. MacTAGGART.
ROBERT G. SCOTT.

Witnesses:
 FREDERICK PIATT,
 STEWART K. ROSS.